Figure 1:
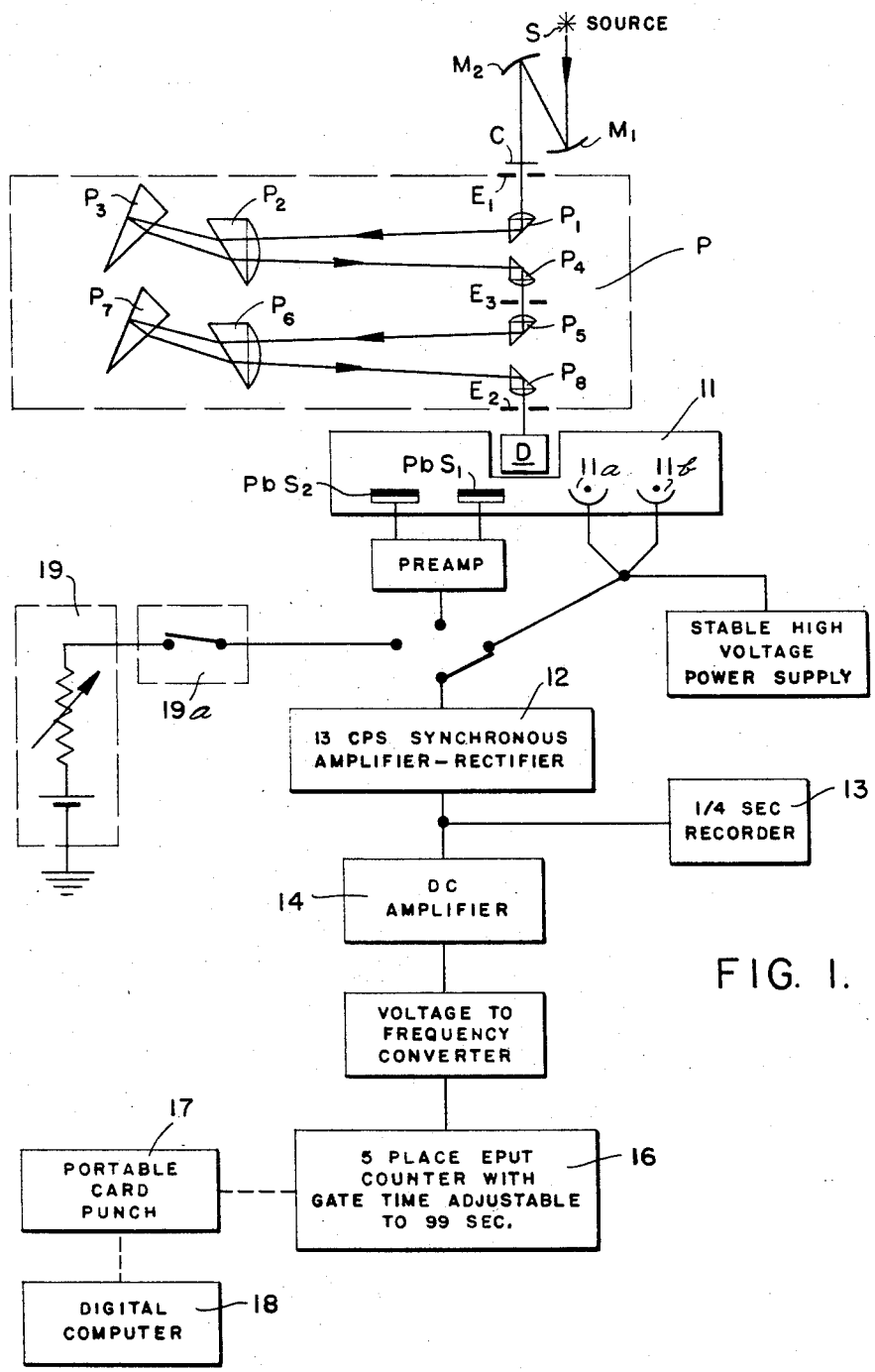

INVENTOR.
HAROLD E. BENNETT

INVENTOR.
HAROLD E. BENNETT

BY

*P. H. Firsht*

ATTORNEY.

INVENTOR.
HAROLD E. BENNETT

United States Patent Office

3,402,634
Patented Sept. 24, 1968

3,402,634
INSTRUMENT FOR MEASURING ABSOLUTE REFLECTANCE AND TRANSMITTANCE AT CRYOGENIC TEMPERATURES
Harold E. Bennett, China Lake, Calif., assignor to the United States of America as represented by the Secretary of the Navy
Filed Mar. 30, 1965, Ser. No. 444,090
5 Claims. (Cl. 88—14)

The invention described herein may be manufactured and used by or for the Government of the United States of America for governmental purposes without the payment of any royalties thereon or therefor.

The instant invention relates generally to an improved reflectometer for measuring absolute reflectance and transmittance of solid-state sample material, and more particularly to an improved reflectometer for obtaining absolute reflectance and transmittance measurements of solid-state, single crystal samples at cryogenic temperatures.

Knowledge of optical properties for given materials provides physicists working in the solid-state fields with valuable and often quite vital information concerning the band structure of the given material. For example, in the intrinsic absorption region, optical constants provide direct information with regard to the joint density of states functions for interband transitions. In the free carrier region, the relaxation time may be determined from optical measurements, when electrical current (D.C.) conductivity for a given material is known. Furthermore, temperature changes will initiate band structure changes for any given solid-state material, which may be observed by detecting temperature initiated changes in the reflectance and transmittance characteristics of the sample.

An earlier device, more fully described in applicant's copending application Ser. No. 78,791, filed Dec. 27, 1960, now abandoned, is capable of providing reflectance and transmittance measurements at room temperatures, which are accurate to ±0.001. However, the device of the copending application is intended to function at room temperatures and is inefficient in utilizing light in the ultraviolet portion of the spectrum and necessarily requires that relatively large optically flat samples be utilized in optically obtaining band structure information, and further requires that at least thirty or more reflections be utilized in the examination of each given sample.

The purpose of the present invention is to overcome these disadvantages, while utilizing the basic principles and retaining the efficiency characteristics of the earlier device.

Briefly, this is achieved by utilizing a system of curved mirrors, similar to that described in the aforementioned application, for twice reflecting an image from a plane polished sample surface. As in the aforementioned application, curved mirrors are used to direct a beam of light which is reflected a first time from the sample surface to a curved mirror. However, in the present invention a plane mirror is disposed adjacent the curved mirror. The curved mirror forms a real image of the sample surface at the time of the first reflection therefrom. The plane mirror is arranged at an angle such that the real image formed by the curved mirror becomes a virtual object whose image is formed on the surface of the sample when the light is reflected at nearly grazing incidence back to the sample. Through the utilization of the plane mirror, the beam of light striking the sample a second time appears to come from a virtual optical system shifted laterally with respect to true optical system, i.e., the system formed by the aforementioned true image forming curved mirror. It will be appreciated that since it is possible to cause the beam of light, as it is reflected by the plane mirror, to strike the surface of the sample at a given angle of incidence differing substantially from that at which the light is first caused to strike the sample for the first reflection, the images formed on the sample may be caused to coincide, or be superimposed, while the light reflected therefrom is caused to follow separate paths extending from the sample surface. This then permits relatively small single crystals to be examined, due to the fact that a much lesser area is required for twice reflecting the light from the surface of the crystal samples. Consequently, the physical dimensions of the samples may be reduced sufficiently for insertion into an efficient Dewar, wherein the temperature of the sample may be reduced to cryogenic temperatures and examined in a manner heretofore deemed impractical.

An object of the present invention is to provide an improved reflectometer which accommodates an examination of relatively small single crystals whose absolute reflectance and transmittance can be measured with precision at cryogenic temperatures.

Another object is to provide in an improved reflectometer which serves to afford a multiple reflection of a beam of light from a common area at a sample surface in a manner such that absolute reflectance may be obtained therefrom.

A further object is to provide an improved reflectometer which operates over a wide wavelength range and which utilizes a plurality of curved and plane mirrors for twice reflecting a beam of light from a single area at a sample surface for making absolute reflectance and transmittance measurements while the temperature of the sample is maintained at cryogenic level, and in which systematic errors may be substantially eliminated.

Figure 2:
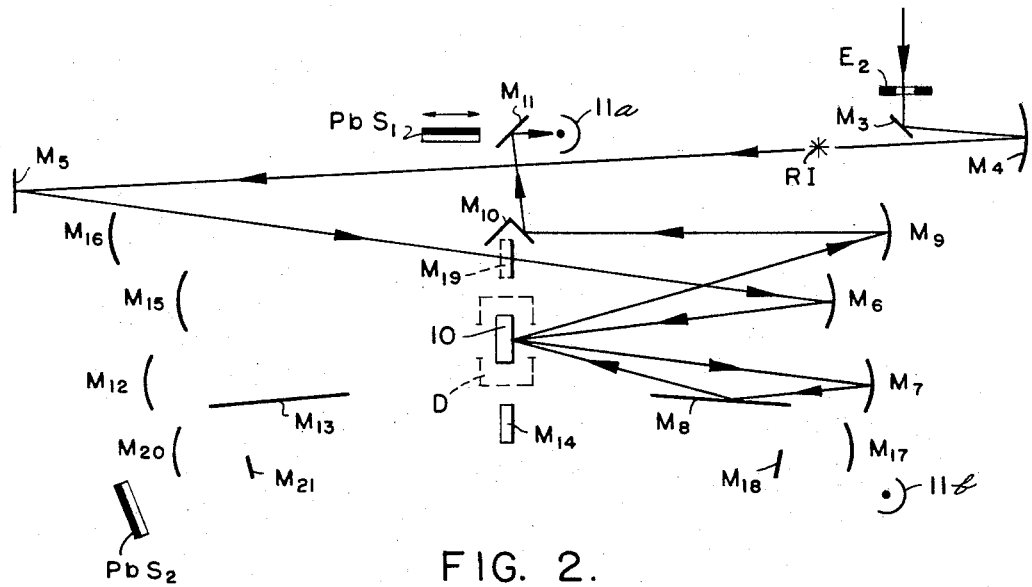
Figure 3:
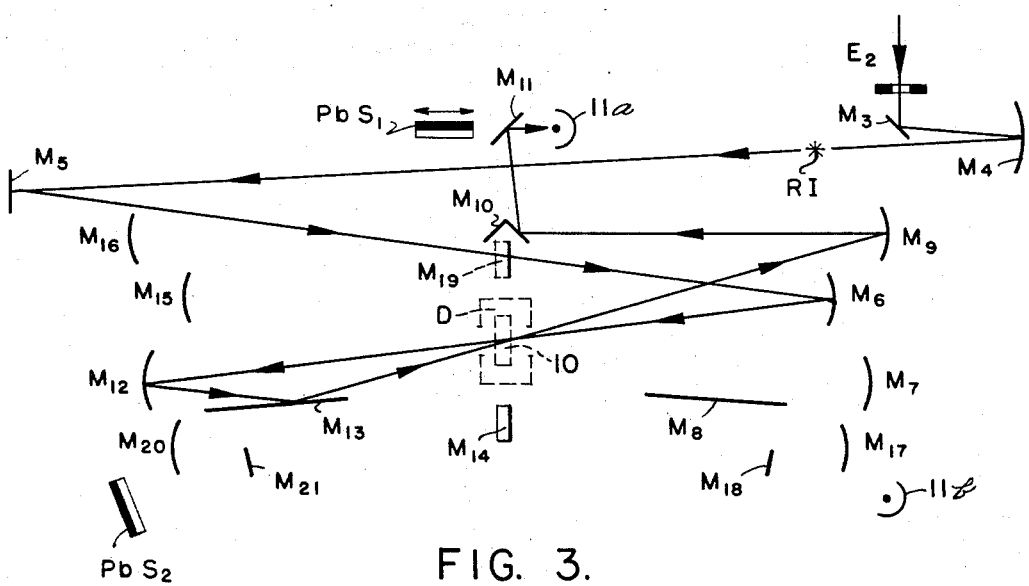
Figure 4:
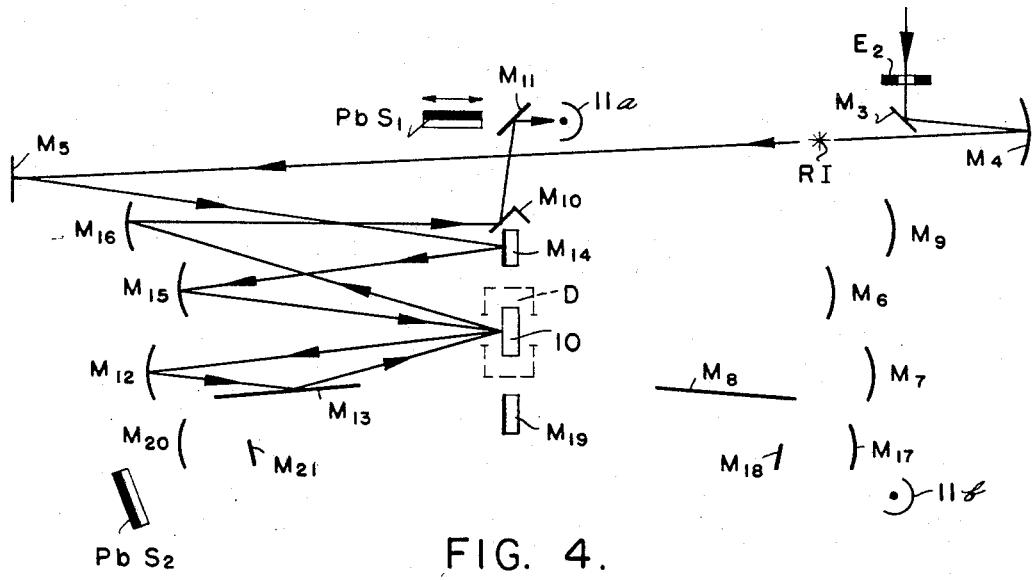
Figure 5:
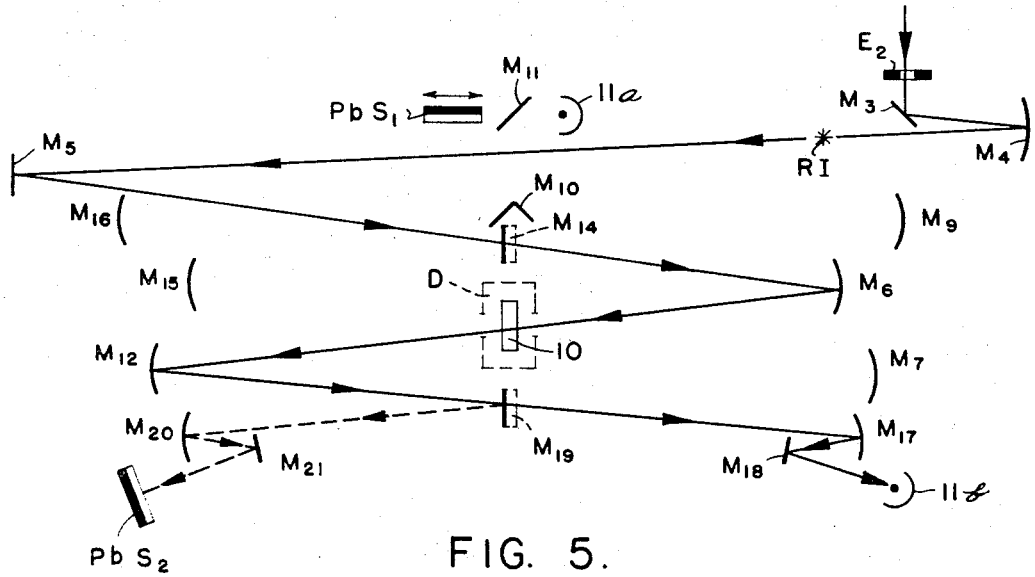
Figure 6:
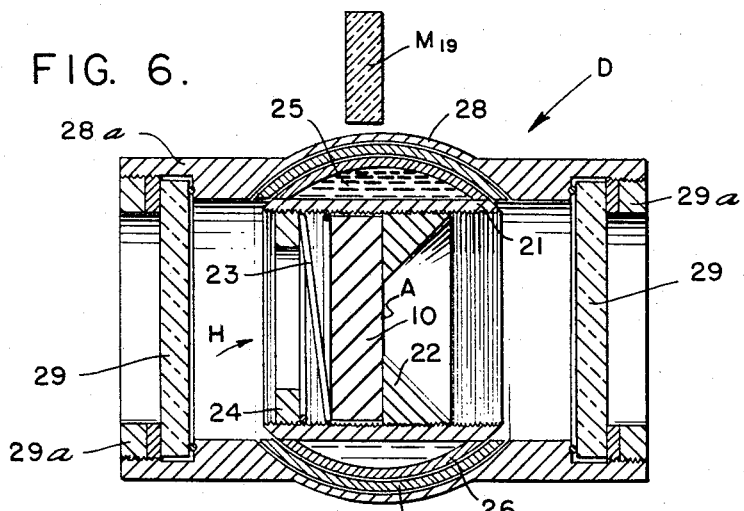
Figure 7:
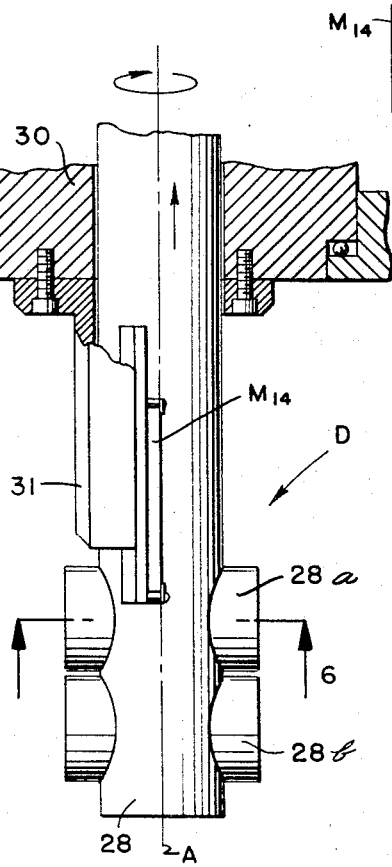
Figure 8:
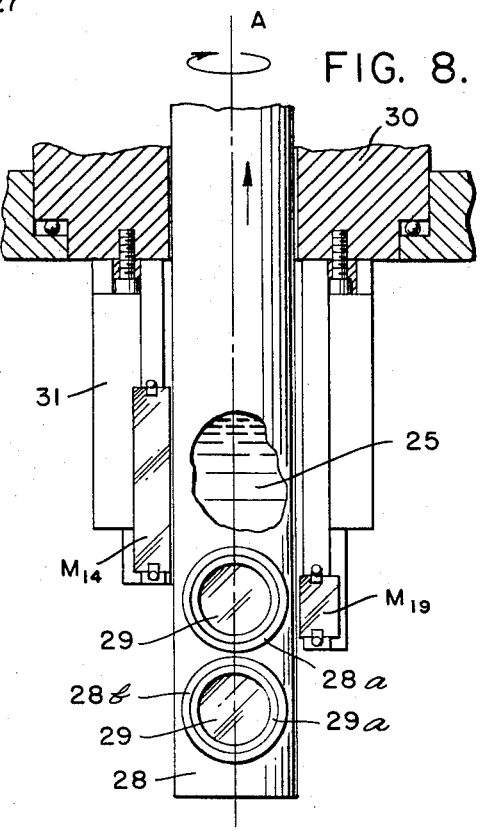

Other objects, feature and many of the attendant advantages of this invention will become readily appreciated as the same becomes better understood by reference to the following detailed description when considered in connection with the accompanying drawings wherein:

FIG. 1 comprises a schematic diagram, in partial block form, illustrating the over-all system of the instant invention;

FIG. 2 comprises a diagrammatic view, in distorted dimension, of paths followed by the light as it is reflected to and from the surface of a sample mounted in a liquid helium cooled Dewar for obtaining absolute reflectance measurements from the cooled sample;

FIG. 3 comprises a diagrammatic view of the paths of the light as it is reflected when the sample is removed from the light beam in order that sample reflectance may be measured directly;

FIG. 4 comprises a diagrammatic view illustrating the paths followed by the light when the Dewar is rotated 180°, for correcting systematic errors imposed through non-equivalance present in mirrors of the system;

FIG. 5 comprises a diagrammatic view of a pair of possible light paths when the system is utilized for obtaining transmittance measurements for the sample mounted in the Dewar;

FIG. 6 comprises a cross sectioned view of the Dewar D taken generally along lines 6—6 of FIG. 7;

FIG. 7 comprises a side elevation of the Dewar D illustrating an arrangement of the sample holders as provided for in the instant invention and the bearing plate which supports the Dewar for rotation about a vertical axis; and FIG. 8 comprises a front elevation of the Dewar D, rotated 90 degrees with respect to the view of FIG. 7.

Referring now to the drawings, wherein like reference characters designate like or corresponding parts throughout the several views, there is schematically shown in FIG. 1 an over-all view of the system of the present invention. A stable light source S, which may comprise a conventional strip filament lamp or hydrogen arc, serves to propagate a beam of light which is directed by a pair of curved mirrors $M_1$ and $M_2$ to impinge on a conventional Muller-Hilger double-monochromator quartz optic system, generally designated P, comprising quarz prism and lens elements $P_1$, $P_2$, $P_3$, $P_4$, $P_5$, $P_6$, $P_7$, and $P_8$. However, arranged between the system P and the mirror $M_2$ there is a 13 c.p.s. (cycles per second) chopper C, of conventional design, which serves to interrupt the beam and provide a pulsed beam to the system P, the purpose of which will be hereinafter more fully appreciated. The chopped beam is admitted to the system P through an appropriately formed slit $E_1$ and emitted from the system P through an exit slit $E_2$. Disposed between the optic elements $P_4$ and $P_5$, there is a conventionally aligned additional slit $E_3$. Through the utilization of this particular optic system, the amount of scattered light passed from slit $E_2$ is limited to .002% of that of the desired wavelength, even in the far ultraviolet portion of the spectrum.

The light is passed from the system to a plurality of mirrors $M_3$–$M_{21}$ mounted within fixed structure to be reflected to the surface of a test sample 10, mounted within a Dewar D, and subsequently to a detector system 11. For the sake of simplicity the mirrors are shown only in schematic form, however, it will be readily appreciated that these mirrors are of conventional design and are mounted within the reflectometer by any suitable means well within the skill of those familiar with the reflectometer art.

As light passes from slit $E_2$, a plane mirror $M_3$, FIG. 2, folds the path of the beam and directs it to the surface of a curved or spherical mirror $M_4$, near which a real image RI of the projection of prism $P_7$, as imaged by $P_8$, i.e., the exit pupil, is formed. This exit pupil is then reimaged on the surface of the sample 10, by a pair of oppositely disposed plane and curved mirrors $M_5$ and $M_6$, respectively. The sample 10 is aligned and removably retained in a vertical plane within the cooling chamber of the Dewar D, which may comprise a nitrogen or helium cooled Dewar, FIGS. 6, 7 and 8, hereinafter more fully described, fixed within the path of the light as it is reflected from the mirror $M_6$. Since the exit pupil RI rather than the exit slit $E_2$ is imaged on the surface of the sample 10, the lateral convergence angle may be reduced from eight degrees, as found at the exit slit $E_2$, to about two degrees at the surface of the sample 10. Further, and importantly, it is to be particularly noted that the area illuminated on the surface of sample 10 may be maintained constant, since the exit pupil is imaged on the sample surface independently of width of slit $E_2$.

The beam of light directed to the sample's surface by mirrors $M_5$ and $M_6$, is now reflected from the surface of the sample 10 to the reflecting surface of a spherical or curved mirror $M_7$, aligned in spaced relationship with the Dewar D. The mirror $M_7$ now images the sample surface and reflects the light to strike the reflecting surface of an off-set plane mirror $M_8$, at almost grazing incidence, FIG. 2. The plane mirror $M_8$ is mounted in a manner such that the light striking it at grazing incidence is reflected to leave the mirror an at angle such that the exit pupil is again imaged, on the surface of the sample 10. In this manner, repeated reflections between the mirror $M_7$ and the surface of the sample is eliminated. Consequently, the images formed upon the reflections of mirrors $M_6$ and $M_8$ are caused to coincide and be superimposed on the surface of the sample 10, while the light beam is caused to strike the surface of the sample 10 at different angles of incidence. Therefore, it will be appreciated that the light striking the sample surface, as it is reflected from the plane mirror $M_8$, appears to come from a laterally shifted virtual optical system. Thus the paths of the beam forming the exit pupil image, formed on the surface of the sample 10 at the time of the second reflection therefrom, and the pupil image formed at the first reflection from the surface are separated as the beam is caused to twice impinge upon the surface of the sample 10 at different angles of incidence.

The beam of light reflected from the mirror $M_8$ and striking the surface of the sample 10 will be reflected and caused to leave the surface of the sample along a predetermined path disposed at an angle with respect to the path of the beam as it is reflected toward the mirror $M_7$. Mounted so as to be disposed within the path of the beam leaving the surface, upon the aforedescribed second reflection, there is a mirror $M_9$ which folds the beam's path to direct the light to a pair of oppositely disposed plane mirrors $M_{10}$ and $M_{11}$, which directs the beam along a folded path to strike a detector 11, FIG. 2.

The detector 11 may be provided with conventional photomultiplier tubes 11a, as well as lead sulfide cells $PbS_1$, which may be alternately disposed within the path of the beam, in place of mirror $M_{11}$, as it is reflected from the mirror $M_{10}$. The particular mode in which the detector 11 is operated, i.e., whether a photomultiplier or lead sulfide cell is utilized, is dictated by the wavelength region at which the measurements are to be made. That is to say the photomultiplier tubes 11 are particularly suited for obtaining measurements in the 2,000–7,000 angstroms range, while the PbS cells are suited for obtaining measurements in the 6,000–25,000 angstrom range. In any event, the detector 11 provides pulsed output signals having an amplitude commensurate with the reflectance characteristics of the surface of the sample 10. These pulsed signals pass through a 13 c.p.s. synchronous amplifier-rectifier circuit 12, synchronized with the chopper C, wherein the signals are converted to D.C. (direct current) signals to provide D.C. input signals to a recorder system, FIG. 1.

The circuit 12 is synchronized with the operation of the chopper C in order that reflectance measurement intelligence may be obtained in the form of D.C. signals for input to a ¼ second, 10 millivolt recorder 13, or if desired, fed through an integrating circuit, comprising a D.C. signal amplifier 14, a voltage to frequency converter 15, and a EPUT (events per unit time) counter 16. The display of counter 16 is proportional to the signal voltage integrated over any desired time interval up to 99 seconds. The output from the counter 16 may be fed through a suitable card punch device 17 for providing an input to a digital computer 18, of conventional design, which serves to calculate and print out the observed reflectance data.

In order to achieve accuracy in the measurements obtained from the optical system it is necessary that the electronic system be both stable and linear. Consequently, selectively connected means, comprising a series connected Dekabox-Mercury cell 19 and a synchronous 13 c.p.s. chopper $19_a$ are utilized to provide an input to the electronic system, whereby the electronic system's stability and linearity may be established. This circuit also serves as a means for troubleshooting the electronic system in the event a malfunction occurs.

Turning now to FIG. 3, it will be appreciated that the present invention provides means for obtaining absolute measurement reflectance directly, without regard to a reflectance standard sample. It will be noted that the beam of light being reflected by the mirror $M_6$ is caused to pass along a path extending through the Dewar D, where the sample S has been removed from the path thereof in a manner as will hereinafter be more fully described, to be imaged on a spherical mirror $M_{12}$, whereupon it is reflected to the surface of a plane mirror $M_{13}$, similar in design to the mirror $M_8$. The mirror $M_{13}$ serves to reflect the beam along a path extending through the Dewar D, in a reverse direction, to impinge upon the mirror $M_9$. From the mirror $M_9$, the beam of light is reflected to the detector 11 by way of mirrors 10 and 11 in the manner aforementioned. Since the exit pupil rather than the exit slit is imaged and since the same number of mirror reflections occur, with the sample S removed from the path of the beam, the ratio of the signals obtained from the detector provides the square of the sample surface reflectance directly. Consequently, this measurement is an absolute measurement, rather than a relative measurement, of sample reflectance. Therefore, it is not necessary that a standard sample whose reflectance is known be utilized in obtaining sample surface reflectance measurements for a given sample.

It is entirely possible that the mirrors of the optical system may not be optically equivalent, whereupon systematic error may be introduced into the resulting measurements. This error may be eliminated by optically interchanging the mirrors, as illustrated in FIG. 4. This interchange is effected merely by rotating the Dewar D through 180° to an alternate position by means hereinafter more fully described, and subsequently obtaining the product of the reflectance measurements derived with the Dewar in its alternate position. If care is taken in the initial positioning of the sample 10 and in optically aligning the instrument, differences in the derived measurements will normally vary by less than 0.1%. Once the Dewar D is rotated, the beam will be interrupted by mirror $M_{14}$ and reflected to mirror $M_{15}$. The beam will then follow a path similar to that aforedescribed, with regard to the path previously described, viz., the beam will be directed to the surface of the sample 10, and reflected to strike a spherical mirror $M_{12}$. The mirror $M_{12}$ directs the beam to a plane mirror $M_{13}$, and again to the surface of the sample, where images are superimposed, and from there to the detector 11 by way of mirror $M_{16}$ and $M_{10}$, in a manner similar to that heretofore described with respect to mirrors $M_9$ and $M_{10}$.

It is to be particularly noted that the system of the instant invention is also intended to function for purposes of obtaining transmittance measurements where the sample 10 possesses semitransparent characteristics. Referring now to FIG. 5, it will be noted that a pulsed beam of light is directed from the mirror $M_6$, in the manner heretofore described, to impinge upon a semitransparent sample 10 arranged within the Dewar D. Since the sample 10 possesses semitransparent characteristics, the beam will pass through the sample and be collected by the mirror $M_{12}$. Here, of course, the light passed by the sample 10 is of primary concern. Consequently, it is necessary that the mirror $M_8$, and particularly the mirror $M_{13}$ and $M_{14}$, be removed from the beam's path in order that the beam be caused to progress along an uninterrupted path toward spherical mirror $M_{17}$. The mirror $M_{17}$ collects the light of the beam and causes the beam to be reflected toward a plane mirror $M_{18}$, which, in turn, reflects the beam to impinge a photomultiplier tube $11b$ of the detector 11. The detector system 11 then functions in the manner aforedescribed to convert the electrical output from the photomultiplier tube $11b$, to intelligence or data in the manner hereinbefore described.

It is also possible, when deemed desirable, to utilize lead sulfide cells for detecting the transmittance characteristics of the sample 10. This is achieved by repositioning mirror $M_{19}$, which for the sake of convenience is slidably mounted for vertical displacement, so that the mirror serves to interrupt the beam directed from the mirror $M_{12}$. It will be appreciated that mirror $M_{13}$ previously has been removed from between mirrors $M_{12}$ and $M_{14}$ and consequently from the path of the beam. Also mirror $M_{14}$, which is mounted on a vertical slide, has been removed from the beam. The mirror $M_{19}$ now directs the beam, by way of mirrors $M_{20}$ and $M_{21}$, to impinge on the lead sulfide cells $PbS_2$ of the detector 11.

Referring now particularly to FIG 6, the Dewar D includes a holder, generally designated H, for releasably retaining the sample 10. The holder H comprises an internally threaded tubular member or casing 21, and an externally threaded retainer ring or stop member 22 threaded into the tubular member 21. The sample 10 is inserted into the housing and retained in an abutting relationship with the ring 22 by means of a compression spring 23 forced into engagement therewith by means of any suitable means such as a lock-ring 24. Thus the positioning of the sample 10 within Dewar D may be adjusted so that the reflecting surface thereof may be aligned in a vertical plane extending through the center of the Dewar 10.

The holder H is surrounded by a body of liquid nitrogen or helium 25 contained in a copper container 26 formed about the external walls of the tubular casing 21. The container 26 may be of any suitable design so long as it is capable of retaining the liquid helium 25 in contact with the external walls of the casing. A conventional heat shield 27 is disposed about the container 26, in spaced relationship therewith, for reducing heat transfer to the casing 26.

The Dewar D is mounted and encased in a vertically disposed tubular housing 28, which surrounds the Dewar D and provides an operative mounting therefor. The lower portion of the housing 28 includes means defining a pair of open-end, superimposed, horizontally aligned evacuated cavities $28_a$ and $28_b$, FIGS. 7 and 8, within which are fixed similar sample holders H, FIG. 6. The cavities $28_a$ and $28_b$ are sealed at their opposite ends by plane-surfaced transparent fused quartz disks 29, removably retained by lock-rings $29_a$. The disks 29 serve as windows for accommodating a passage of the aforementioned light beams into the cavities $28_a$ and $28_b$, in order that the beams may be caused to impinge on the sample 10 when the sample is retained by the holder H and a beam is directed through the windows. However, if the sample 10 is removed from the holder H, it will be appreciated that the beams of light, as they are directed into the cavities $28_a$ and $28_b$, will pass in an uninterrupted manner therethrough.

In order to accommodate the required displacement of the Dewar D, the housing 28 is secured in a telescoping manner to a horizontal bearing plate 30 by means of telescoping brackets 31. Consequently, the Dewar D may be slidingly raised and lowered, by means not shown, within the brackets 31 and rotated 180 degrees through a rotation of the bearing plate 30. As a matter of convenience, the mirrors $M_{14}$ and $M_{19}$ are removably fixed to the brackets 31 to rotate therewith.

Therefore, it is to be understood that the sample 10 mounted, for example, in cavity $28_a$, may be removed from the path of the beam, as illustrated in FIG. 3, by raising the Dewar D through the brackets 31, and may be rotated 180 degrees, FIG. 4, by rotating the bearing plate 30. Consequently, the sample may be removed from the path of a beam or rotated without being removed from the Dewar, particularly since the cavities $28_a$ and $28_b$ are aligned to assume alternate positions as the Dewar D is displaced in vertical directions.

It will be further appreciated that it is entirely feasible to utilize a single holder H in employing the device according to the teaching of the instant invention, however, by providing a second holder H within the cavities a standard sample surface may, where desired, be utilized. The significant purpose of the second cavity is to provide a second path for the beam as the cavity retaining sample 10 is displaced from the path of the beam, in the manner heretofore described.

It is to be further understood that the Dewar D is mounted and suspended within a darkened cabinet, not shown, which includes suitable means or brackets, also not shown, for mounting the various mirrors relative to the Dewar D, as hereinbefore mentioned.

In view of the foregoing it is to be understood that the present invention includes a practical device which may be utilized to measure the reflectance and transmittance characteristics of very small samples at cryogenic temperatures.

Obviously may modifications and variations of the present invention are possible in the light of the above teachings. It is therefore to be understood that within the scope of the appended claims the invention may be practiced otherwise than as specifically described.

What is claimed is:

1. An optical system adapted for use in measuring absolute reflectance and transmittance of electropolished single crystal samples comprising in combination:
   a horizontally rotatable liquid helium Dewar including means defining therein a sealed and evacuated chamber having at least one pair of opposed cavities comprising transparent plane-surfaced windows adapted to transmit an externally generated beam of light transversely through said chamber;
   crystal support means arranged within said chamber for supporting a single crystal sample having a polished surface in a beam interrupting position within said chamber and between said windows so that said polished surface is in a substantially parallel relationship with respect to the plane surfaces of said windows and extends along the vertical axis of rotation of said Dewar;
   a source of light;
   a double-monochromator optic system, including an exit pupil, for producing from said source a monochromatic beam of light;
   a first plurality of mirrors to intercept the beam and to reflect the beam along a folded path extending through one of said windows into said Dewar and to image the exit pupil on the polished surface of a crystal sample supported by said support means;
   a second plurality of mirrors to intercept the beam as the polished surface reflects the beam along a second folded path extending through said one window and to reimage the exit pupil on the sample surface a second time in a manner such that the two images are aligned in a coinciding and superimposed relationship;
   a third plurality of mirrors to intercept the beam as it is reflected a second time from the polished surface of said crystal sample along a path extending through said one window to direct the beam along a third folded path; and
   light responsive detector means disposed in the third folded path for detecting the beam and providing an output signal indicative of the surface reflectance for said polished surface of said sample.

2. The system according to claim 1 further comprising:
   sample displacing means to remove said polished surface from said first folded path;
   a fourth plurality of mirrors disposed in a displaced and optically aligned relationship with respect to said first plurality of mirrors to intercept said beam as it is directed by said first plurality of mirrors and to reflect said beam along a fourth folded path extending toward said third plurality of mirrors when said sample is removed from said path, whereby said beam is caused to be intercepted and directed by said third plurality of mirrors to be detected by said detector means in the absence of said sample surface.

3. The system according to claim 2 wherein the sample displacing means comprises:
   a telescoping and rotatable mounting means to support said Dewar for reciprocal displacement in vertical directions and for horizontal rotation about the vertical axis of rotation thereof extending along the plane through the centerline of said crystal sample surface, whereby the crystal sample surface of a crystal supported by said support may be vertically displaced as well as rotated through 180 degrees from a first to a second surface disposition.

4. The system according to claim 3 further comprising:
   a fifth plurality of mirrors to intercept said beam as it is directed along said first folded path and in cooperation with said third and fourth pluralities of mirrors to direct the beam along a plurality of folded paths for causing the exit pupil to be imaged and then reimaged in coinciding, superimposed relationship on the polished surface of said crystal subsequent to a rotation thereof to its second surface position, and to direct said beam to said detector means as it is reflected a second time from said polished surface disposed in its second position, whereby reflectance error introduced through misalignment of said sample relative to said optical system may be detected.

5. The system according to claim 4, further comprising:
   second detector means mounted in said system;
   a sixth plurality of mirrors; and
   means associated with said fourth plurality of mirrors for removing one of said mirrors from said fourth folded path so that said sixth plurality of mirrors intercepts said beam of light as it is directed in said fourth folded path when said sample comprises a semitransparent sample disposed within said first folded path, and which accommodates a passage of the light beam therethrough as a beam is directed by said first plurality of mirrors through said windows, whereby sample transmission characteristics may be detected and measured at said second detector means.

No references cited.

JEWELL H. PEDERSEN, *Primary Examiner.*

W. A. SKLAR, *Assistant Examiner.*